US011752414B2

(12) United States Patent
Davey et al.

(10) Patent No.: US 11,752,414 B2
(45) Date of Patent: Sep. 12, 2023

(54) SYSTEM AND METHOD FOR TRACKING A PROJECTILE

(71) Applicant: Fast Track Vision, LLC, Hartford, CT (US)

(72) Inventors: John Alan Davey, Hartford, CT (US); Robert J. Dyer, Concord, MA (US); Andrew Robert Nota, Jamestown, RI (US)

(73) Assignee: Fast Track Vision, LLC, Hartford, CT (US)

( * ) Notice: Subject to any disclaimer, the term of this patent is extended or adjusted under 35 U.S.C. 154(b) by 333 days.

(21) Appl. No.: 16/999,323

(22) Filed: Aug. 21, 2020

(65) Prior Publication Data

US 2021/0052964 A1 Feb. 25, 2021

Related U.S. Application Data

(60) Provisional application No. 62/890,326, filed on Aug. 22, 2019.

(51) Int. Cl.
*A63B 69/38* (2006.01)
*A63B 71/06* (2006.01)
*A63B 61/00* (2006.01)

(52) U.S. Cl.
CPC .......... *A63B 69/38* (2013.01); *A63B 61/003* (2013.01); *A63B 71/0622* (2013.01)

(58) Field of Classification Search
CPC .... A63B 69/38; A63B 61/003; A63B 71/0622
See application file for complete search history.

(56) References Cited

U.S. PATENT DOCUMENTS

| 3,989,246 | A | * | 11/1976 | Brown | A63B 47/025 124/53.5 |
| 4,995,371 | A | * | 2/1991 | Kuizinas | A63B 69/40 124/36 |
| 5,816,953 | A | * | 10/1998 | Cleveland | A63B 69/38 463/3 |
| 6,283,876 | B1 | * | 9/2001 | Northcutt | A63B 69/0002 473/422 |
| 9,773,330 | B1 | * | 9/2017 | Douglas | G06F 3/14 |

(Continued)

FOREIGN PATENT DOCUMENTS

| CN | 108697922 A | * | 10/2018 | | A63B 1/00 |
| FR | 2706779 A1 | * | 12/1994 | | A63B 47/025 |

(Continued)

*Primary Examiner* — Raleigh W Chiu
(74) *Attorney, Agent, or Firm* — Occhiuti & Rohlicek LLP

(57) ABSTRACT

An apparatus comprising a practice device for practice of hitting a tennis ball includes a server configured for serving the tennis ball to a user, a net disposed to intercept a flight of the tennis ball after the tennis bell has been hit by the user using a racket and to direct the captured tennis ball back towards the server to be served again to the user, an image detector configured to observe the tennis ball as the tennis ball hurtles towards the net, and a processor. The processor determines, based at least in part on image frames received from the image detector, data indicative of the tennis ball's virtual landing spot. This virtual landing spot is an estimate of where the tennis ball would have landed on an opposing court had the tennis ball not been intercepted by the net.

22 Claims, 10 Drawing Sheets

(56) References Cited

U.S. PATENT DOCUMENTS

| | | | | |
|---|---|---|---|---|
| 2002/0115046 A1* | 8/2002 | McNitt | .............. | A63B 69/36 |
| | | | | 434/252 |
| 2002/0165048 A1* | 11/2002 | Parkinson | ............ | A63B 69/406 |
| | | | | 473/459 |
| 2009/0170640 A1* | 7/2009 | Thompson | ............. | A63B 69/38 |
| | | | | 434/258 |
| 2014/0180451 A1* | 6/2014 | Marty | ................... | G06F 3/016 |
| | | | | 700/91 |
| 2017/0061817 A1* | 3/2017 | Mettler May | ........ | A61B 5/1124 |
| 2017/0368439 A1* | 12/2017 | Khazanov | .......... | A63B 24/0075 |
| 2018/0001138 A1* | 1/2018 | Sinha | ................ | G09B 19/0038 |
| 2018/0043229 A1* | 2/2018 | Stemle | .............. | A63B 24/0006 |
| 2018/0200602 A1* | 7/2018 | Simón Vilar | .......... | G06V 20/42 |
| 2020/0197782 A1* | 6/2020 | Abdelmoneum | .. | A63B 24/0062 |
| 2021/0052964 A1* | 2/2021 | Davey | ................. | A63B 43/008 |

FOREIGN PATENT DOCUMENTS

| | | | | |
|---|---|---|---|---|
| KR | 2019031111 A * | 3/2019 | ......... | A63B 24/0087 |
| WO | WO-2016116780 A1 * | 7/2016 | ......... | A63B 24/0006 |
| WO | WO-2019177361 A1 * | 9/2019 | ......... | A63B 24/0087 |
| WO | WO-2019177364 A1 * | 9/2019 | ......... | A63B 24/0087 |
| WO | WO-2020070261 A1 * | 4/2020 | ........... | A63B 63/004 |

* cited by examiner

SYSTEM AND METHOD FOR TRACKING A PROJECTILE

FIELD OF DISCLOSURE

This disclosure relates to measuring characteristics (e.g., trajectory) of moving objects including those used in sporting activities (e.g., tennis).

BACKGROUND

To improve one's skill at swinging a tennis racket, it is desirable to practice swinging frequently. This can be carried out in an enclosed space, provided one is not actually hitting a ball. While such swinging practice is beneficial, the absence of a ball limits its effectiveness.

To practice with a ball, tennis players often hit the ball against a wall. In many cases, the wall has a stripe at the same height as the top of the net. This enables the player to practice clearing the net.

However, it is one thing to clear the net and another thing altogether to direct the ball so that it lands within a designated location in the opponent's court. To practice this skill, there exist ball launchers that can be placed in the opponent's court. A player can then practice returning balls that are launched by this ball launcher. Since this all takes place on a real court, the player can easily see where a returned ball lands on the opposite court.

However, this type of practice monopolizes an entire tennis court. This means that one must compete for a scarce resource. Additionally, one must have a large supply of tennis balls to avoid having to refill the ball launcher. This means that one must spend a great deal of time picking up balls.

SUMMARY

The invention overcomes the foregoing difficulties by providing a way to practice placing or returning the ball in particular locations in an opponent's court without actually having to use a real tennis court. As a result, it is possible to engage in such practice within a confined space. This permits practice to be carried out even in periods of inclement weather, darkness, or excessive air pollution. The devices and methods described herein, although described in terms of a tennis ball, are applicable to other kinds of projectile. Examples include baseball, golf, racquetball, polo, cricket, pelota, jai alai, and similar sports that involve imparting kinetic energy to a projectile that is expected to move over significant distances.

In one aspect, the invention features a system comprises a launching device for propelling a projectile into space; an image detector configured to and positioned relative to the launching device for detecting the projectile; and a processor for calculating and storing trajectory characteristics of the projectile based on images received from the image detector.

Embodiments include those in which the processor calculates and stores trajectory characteristics of the projectile, based on one or more characteristics of the projectile, such as its speed, rotation, spin, direction, and velocity vector, including both translational velocity and angular velocity. In other embodiments, the processor carries out deblurring.

In some embodiments, the image detector is a camera. In other embodiments, the image detector includes a charge-coupled device. In yet other embodiments, the image detector is a constituent of a personal digital-assistant or smartphone.

In some embodiments, the launcher includes a catapult.

In other embodiments, the launcher includes a docking mount for receiving the image detector.

Also, among the embodiments are those in which the launcher includes a trigger for triggering the image detector when the projectile is launched. Among these are embodiments that have a video trigger, a mechanical trigger, and an audio trigger.

In other embodiments, the apparatus further includes a graphic overlay. Such an overlay is useful for aligning features in the field-of-view for calibration. Such features may include features within the practice area.

In another aspect, the invention features a method for use with a practice device for propelling a projectile into space. The method comprises detecting a launch of the projectile; recording its movement; computing its trajectory characteristics based on recorded data; and displaying data associated with the computed trajectory characteristics of the projectile.

Some practices of the method include calibrating the system. Among these practices of the method are those that include aligning the image detector with pertinent features within a field-of-view.

Such alignment is useful for determining the projectile's trajectory. In those embodiments in which processing is carried out by an app in a smart phone, the app displays guides to allow the user to accurately align the camera to features in the practice area in an effort to optimize the location of the camera's field-of-view. Examples of such guides include lines extending vertically and horizontally on a display.

Some practices carry out event-detection procedures for determining when to record high-speed video and when not to. This is particularly useful because it is only the return of the projectile that would be influenced by the player's swing. Therefore, it is only the return of the projectile that is of most value.

Other practices carry out image processing that identifies a moving object and eliminates background data and data that represents those objects in the field-of-view that are not of interest.

Yet other practices carry out a transform to account for the position of the image detector and any of its inherent properties. Examples of such inherent properties include example the focal length of a camera lens. Such a transform permits creation of a map of the projectile's trajectory in three-dimensional space.

Yet other practices include those that determine one or more kinematic properties of the projectile. These include the projectile's spin, angular velocity, and translational velocity. The resulting values are then used as a factor in calculating the projectile's trajectory.

Yet other practices include those that receive data concerning external factors, such as humidity, temperature, and altitude, and that use such data as part of calculating the projectile's trajectory. Such data can be downloaded from external data sources such as a web site or a web server.

Yet other practices report information to the user or store it for the user's review at a later time. Examples of such information include trajectory information.

In another aspect, the invention features an apparatus comprising a practice device for practice of hitting a tennis ball, the practice device comprising a server configured for serving the tennis ball to a user, a net disposed to intercept a flight of the tennis ball after the tennis bell has been hit by the user using a racket and to direct the captured tennis ball back towards the server to be served again to the user, an image detector configured to observe the tennis ball as the tennis ball hurtles towards the net, a processor configured to determine, based at least in part on image frames received from the image detector, data indicative of an estimate of a virtual landing spot of the tennis ball, the virtual landing spot being where the tennis ball would have landed on an opposing court had the tennis ball not been intercepted by the net, and a display for enabling the user to view the data.

The processing system described herein is a non-abstract system that carries out its activities in a non-abstract manner. As used herein, Applicant, acting as his own lexicographer, hereby defines "non-abstract" to be the converse of "abstract" and also defines "abstract" to mean what the Supreme Court and Federal Circuit have deemed it to mean as of the filing date of this application. All claims shall be construed to cover only non-abstract subject matter. Any person who construes a claim as covering abstract subject matter is therefore, by definition, mistaken.

These and other feature of the invention will be apparent from the following detailed description and the accompanying figures in which:

DETAILED DESCRIPTION

Figure 1:
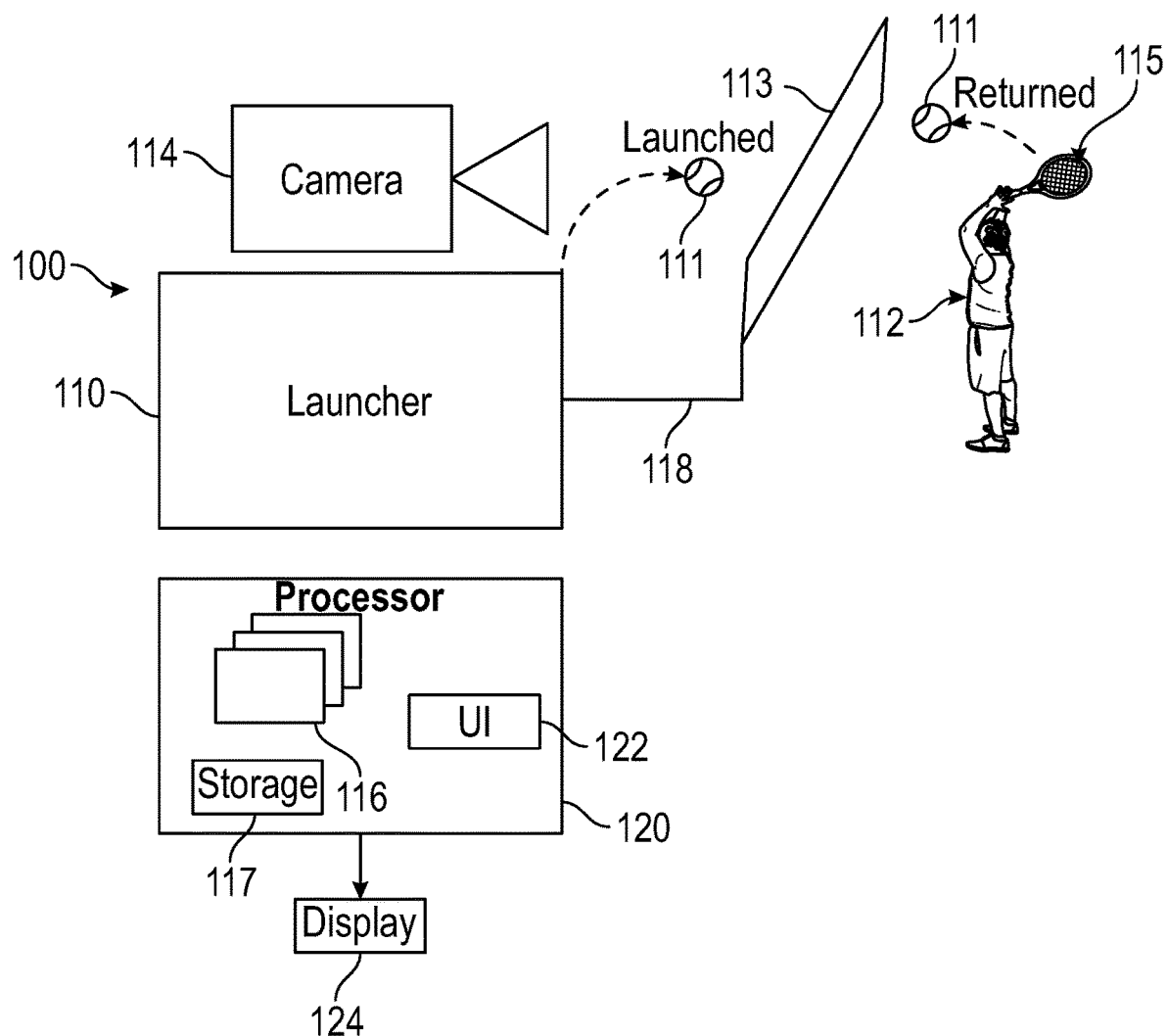
FIG. 1 shows a practice device for use in tennis practice.

Referring to FIG. 1, a practice device 100 includes a tennis-ball server 110 that serves a tennis ball 111 towards a tennis player 112 with a predetermined but adjustable velocity vector.

The tennis player 112 hits the ball 111, thus sending it into a net 113. After having received the ball 111, the net 113 directs the ball into a chute 118 that leads back to the server 110 so that the ball 111 can be launched once again.

Figure 2:
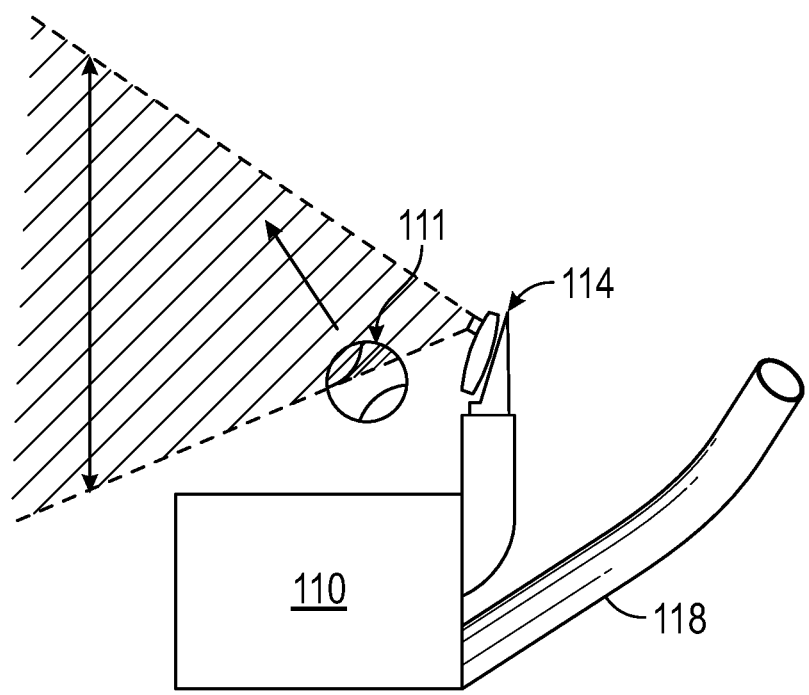
FIG. 2 shows a server for the practice device shown in FIG. 1.

Referring to FIG. 2, the practice device 100 includes a camera 114 for acquiring frames 116, each of which include an image of the tennis ball 111 at a different time. In a typical embodiment, the camera 114 avoids acquiring images until the player 112 has actually struck the ball 111, at which point the camera 114 begins image acquisition. This is because the ball's path towards the player 112 is not influenced by the player's swing and is therefore not of interest.

Figure 3:
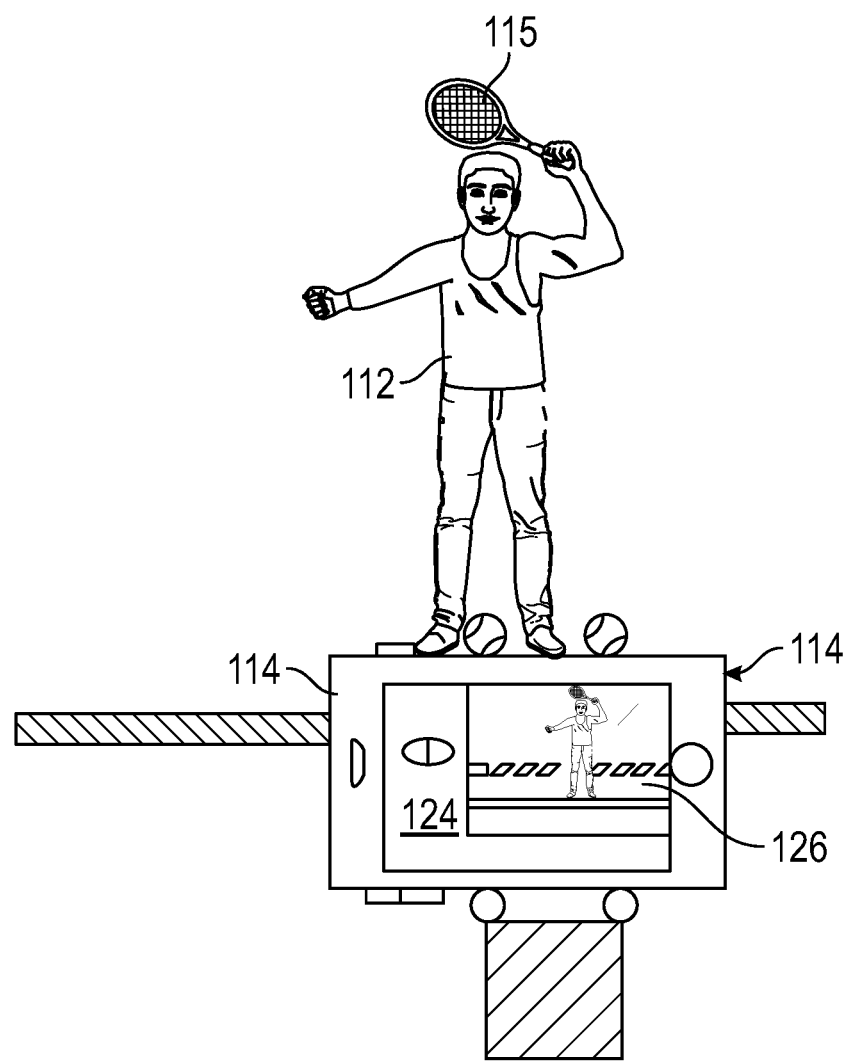
FIG. 3 shows a camera pointing to a tennis player using the practice device shown in FIG. 1.

The camera 114 is disposed at a location at which it has a good view of the ball 111. In some embodiments, the camera is at the server 110 and views the ball 111 as it proceeds towards the player 112, as shown in FIG. 3. In this embodiment, the camera 114 would be between the player 112 and the net 113.

However, in other embodiments, the camera 114 is located behind the player 112 so that it is looking towards the net 113. In that case, the player 112 is between the camera 114 and the net 113.

It is particularly useful if the camera 114 is placed such that the expected direction of the ball's velocity vector is coincident with the camera's focal axis. This enables the processing system 120 to measure the ball's velocity more accurately. In some cases, whether the camera 114 is oriented horizontally or vertically makes a difference. It has been found that a horizontal orientation yields a sharper image.

The practice device 100 also features a processing system 120 that includes a memory 117 for storing information concerning the position and orientation of the camera 114 as well as the camera's inherent properties, for example, the focal length of its lens. The tennis player 112 would typically provide this information through a user interface 122 as part of setting up the practice device 100 for use.

The camera 114 provides the acquired images to the processing system 120. The processing system 120 then identifies those portions of each image associated with the moving tennis ball 111. After having done so, it filters out remaining portions of each image. These remaining portions include the background and any objects that are not relevant to the tennis ball 111.

The processing system 120 generates and stores data associated with the moving tennis ball 111. It then retrieves the location information from storage and uses it as a basis for applying a transform to account for the position and properties of the camera 114. This results in transformed data.

The processing system 120 then processes the transformed data to determine various dynamic properties of the moving tennis ball 111. These characteristics include the tennis ball's translational velocity and its angular velocity, the latter resulting from any spin associated with the tennis ball 111. This defines the ball's observed trajectory in three-dimensional space between the tennis racket 115 and a net that ultimately receives the tennis ball 111 and directs it into a chute 118 so that it can be launched again.

This observed trajectory also provides a basis for determining a virtual trajectory. The virtual trajectory is an estimate of where the tennis ball 111 would have traveled had it not been intercepted in mid-flight by the net 113. This virtual trajectory includes a virtual landing spot, which is where the tennis ball 111 would have landed in an opposing court had it traversed the virtual trajectory.

In some embodiments, the virtual trajectory is based at least in part on an observation of the ball's rotation. The ball's rotation is defined by an axis of rotation and an angular velocity about that axis. Observing the movement of markings on a ball provides a way to estimate spin. These markings can include a manufacturer's logo, gaps between the felt areas of a tennis ball 111, or stitching.

A difficulty that arises is that the relationship between frame rate and spin rate may lead to aliasing. To promote the processing system's ability to obtain the ball's rotation, it is useful to provide a ball 111 with suitable marks 131, such as a line pattern with perpendicular elements arranged around the ball 111 or a dot pattern.

Preferably, the ball 111 has marks 131 that are defined by the intersections of the ball's surface with the positive and negative axes of a Cartesian coordinate system that has its origin at the ball's center. In the three-dimensional space of the ball 111, there are six such intersections.

Figure 4:
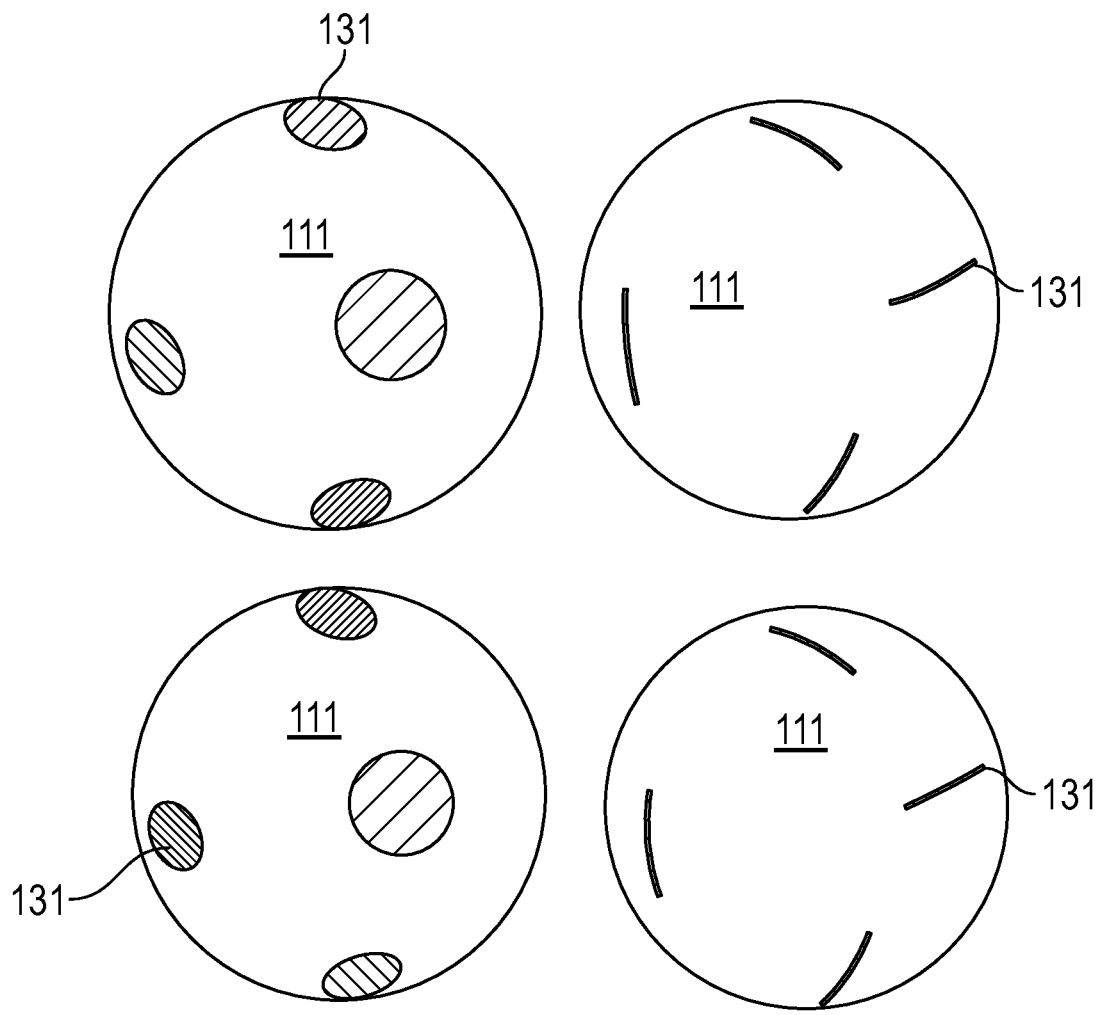
FIG. 4 shows ball markings for the ball shown in FIG. 1.

The marks 131 can be any shape so long as they are clearly visible to the camera 114. FIG. 4 shows examples of suitable markings.

A particularly useful feature of racket sports, such as tennis, is that it is often possible to infer the rotation direction by careful inspection of frames that were obtained during a brief interval around when the racket 115 hits the ball 111. This point can be determined by a trajectory measurement, and in particular, by seeing when the ball 111 abruptly changes its motion direction. If at this instant one were to inspect the pixels around the ball 111 for movement from one frame to the next, it is possible to determine whether the racket was moving up, down, or forward at the moment of impact. Under these circumstances, an upward movement of the racket 115 implies top spin and a downward movement of the racket 115 implies back spin.

To promote the ability to detect the direction of the rotation axis without having to resort to observing the racket 115, it is useful for the marks 131 to be of different colors. Such marks 131 can be provided at the time of manufacture or added after manufacture by affixing decals to appropriate points on the ball 111.

Figure 5:
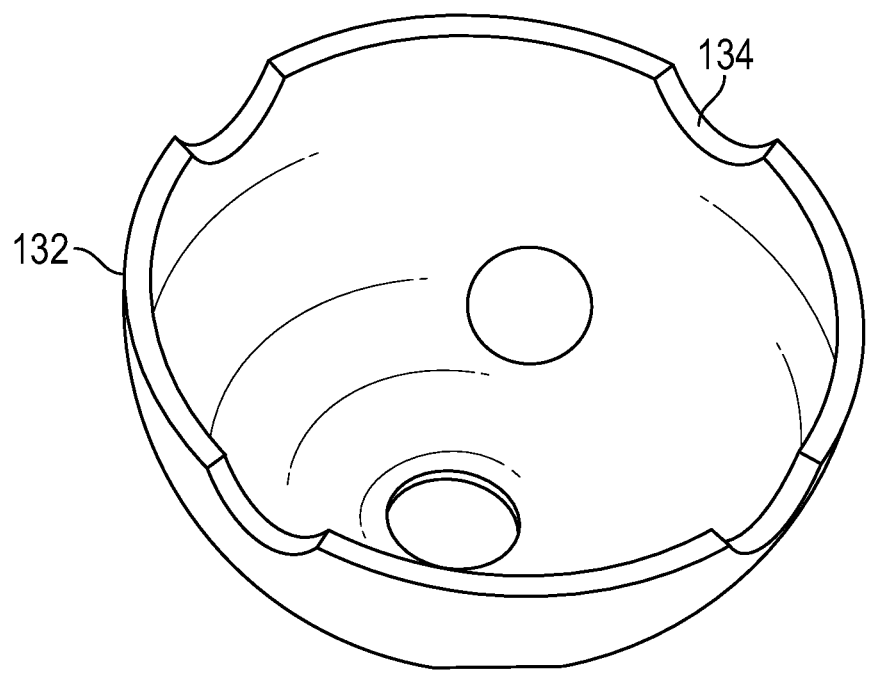
FIG. 5 shows a stencil used to mark a ball as shown in FIG. 4.

FIG. 5 shows a stencil 132 that is useful for precisely marking the ball 111 at each of several marking recesses 134. In some embodiments, a hinge connects two stencils 132 so that the ball 111 can be completely enclosed during marking. This promotes more precise marking.

The predicted trajectory can be used to determine where the ball 111 would have landed had its flight not been interrupted. For example, the predicted trajectory can be used to determine where the ball 111 would have landed in an opponent's court had the ball 111 been struck in the same way on an actual tennis court.

In some embodiments, the processing system 120 includes inputs for receiving additional data that affects the tennis ball's trajectory. These can be provided by the tennis player 112 or downloaded from suitable web sites. Examples of such factors that are known to affect the ball's flight are humidity, temperature, and altitude.

The processing system 120 also includes a display 124 that provides relevant feedback to the tennis player 112. In some embodiments, the display 124 shows the trajectory and flight path data in a number of presentation formats, such as graphically or numerically. In other embodiments, the display 124 provides information about observed velocity and spin.

It is important for successful operation that the camera's position be established and known by the processing system 120. The processing system 120 uses this data to transform the two-dimensional image that it acquires from the camera into a prediction about the tennis ball's trajectory, both real and virtual, as it moves through three-dimensional space as well as to obtain other information that may be of interest. Examples of such information include maximum ball speed and the ball's height as it clears the virtual net.

As shown in FIG. 3, the camera 114 is placed above the server 110 so that the player 112 is within the camera's field-of-view. The camera 114 is tilted slightly upward to maximize the field-of-view from which usable information can be gathered. Viewing more court surface in front of the player 112 is unnecessary as any balls 111 in that region would not make it into an opposing court anyway.

In FIG. 3, the display 124 uses a graphic overlay 126 to show the camera scene with lines to indicate features of the court such as the lines on the ground and the tennis net The player 112 uses the graphic overlay 126 to align court features. Once properly aligned, the processing system 120 uses the position information in image processing. In some embodiments, a graphic overlay 126 is also used to visualize the ball's virtual trajectory.

In some cases the player 112 may want an arbitrary angle and position of the camera 114. In this case a user interface 122 would allow for selection of points to indicate the critical features of the court, such as the net. The player 112 would select points on the display 124 that correspond to the required features. The processing system 120 would then use these selected points and the known dimensions of those to determine the angle and position of the camera 114. From that point the processing system 120 can use this information in determining the ball's trajectory.

Since many smart phones already come with a camera 114 in intimate association with a processing system, a particularly useful embodiment is one in which the processing system 120 and the camera 114 are constituents of a smart phone that is placed in a holder on the server 110 in such a way as to direct the camera's field-of-view to cover a zone through which the ball 111 is expected to pass. In such cases, suitable application software is used to configure the smart phone to carry out the relevant data-processing tasks, essentially causing the smart phone to function as the processing system 120.

In such a case, it is useful to have the camera 114 and the display 124 facing in opposite directions. To provide the player 112 with suitable feedback with each volley, it is particularly useful to configure the processing system 120 to communicate useful information about the volley with the player 112. This can be carried out by using a synthesized voice or by flashing the camera's built-in flash according to a set of pre-determined patterns, each of which has a meaning.

In an alternative embodiment, a reflector reflects an image of the display 124 back to the player 112. In such an embodiment, it is useful for the processing system 120 to invert the image on the display 124 to account for the unavoidable inversion that results from such a reflection.

In another embodiment, the ball server 110, the processing system 120 and the camera 114 can all be integrated into a single unit.

Figure 6:
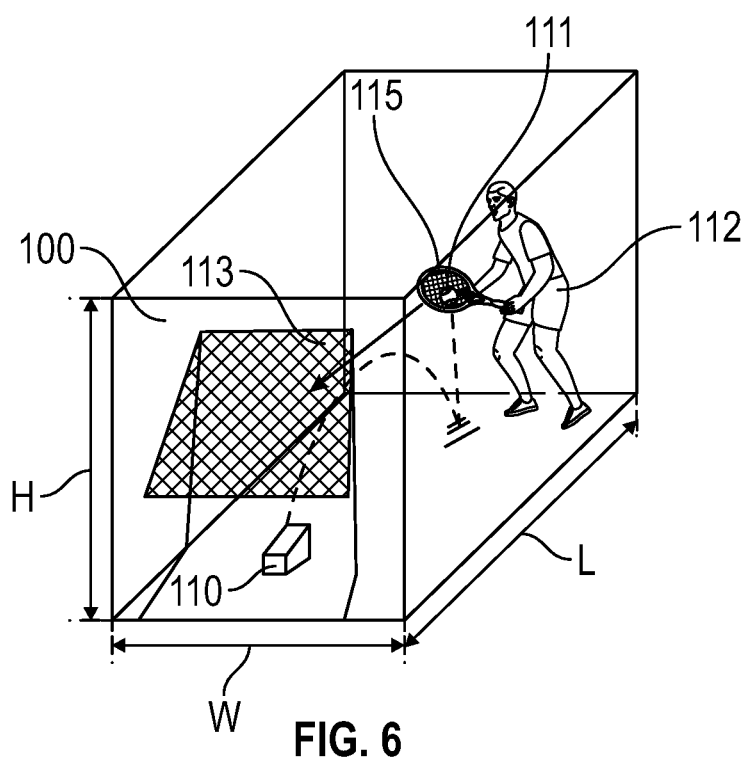
FIG. 6 shows the practice device of FIG. 1 being used in a confined space.

As shown in FIG. 6, a practice device 100 along the lines of the foregoing requires only a small footprint and can therefore be used in confined indoor spaces. This means that the practice device 100 can be used day or night in inclement weather or otherwise. In the illustrated embodiment, the width, and height of the room in which the practice device 100 is shown being used is eight feet and the length is nine feet.

Additionally, the practice device 100 maintains the real feel of hitting a ball 111 with a racket 115 since, after all, the player 112 is, in fact, hitting the ball 111 with a racket 115.

Figure 7:
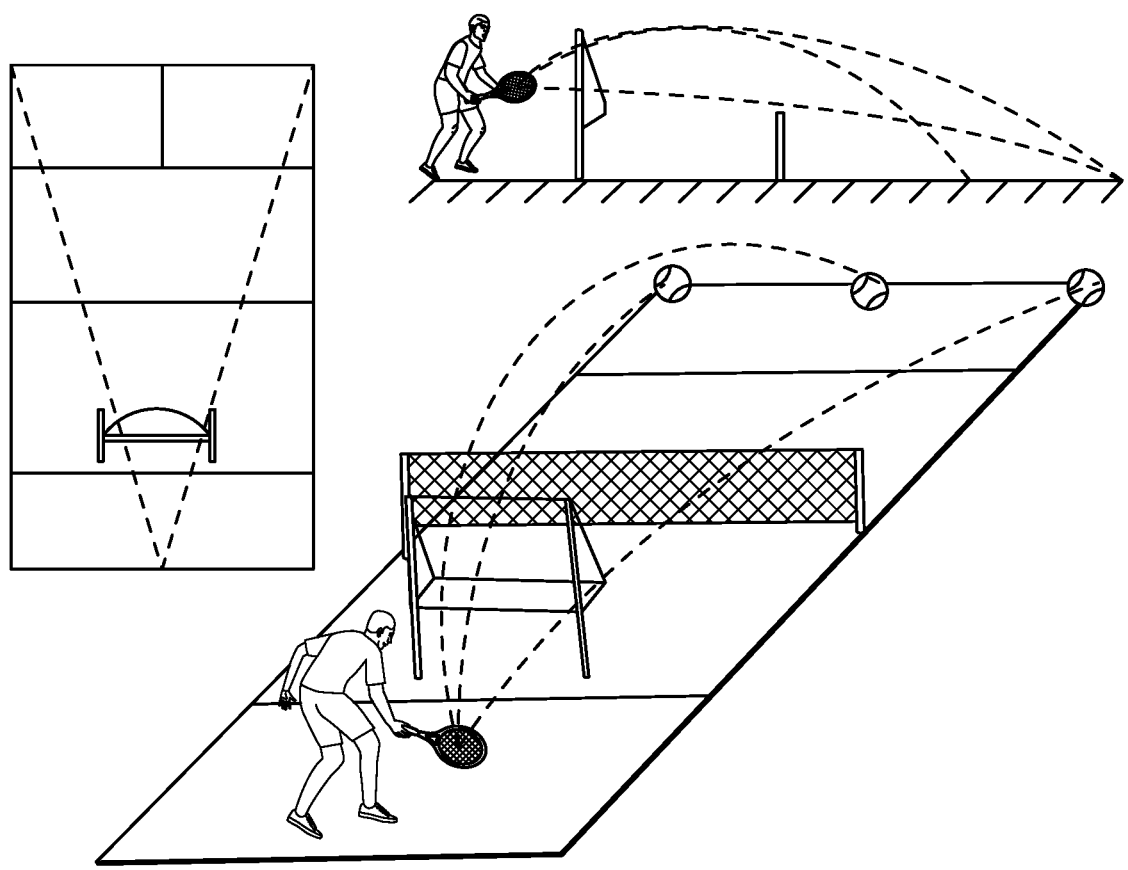
FIG. 7 illustrates the significance of the net size in the practice device shown in FIG. 1.

Referring to FIG. 7, The net 113 can be made as large as the confined space requires. However, at a minimum, the net 113 should be large enough to capture any shot having a reasonable trajectory that would, in fact, land within the opponent's court. The size of the net 113 therefore provides a way to replicate the dimensions of an actual tennis court.

Figure 8:
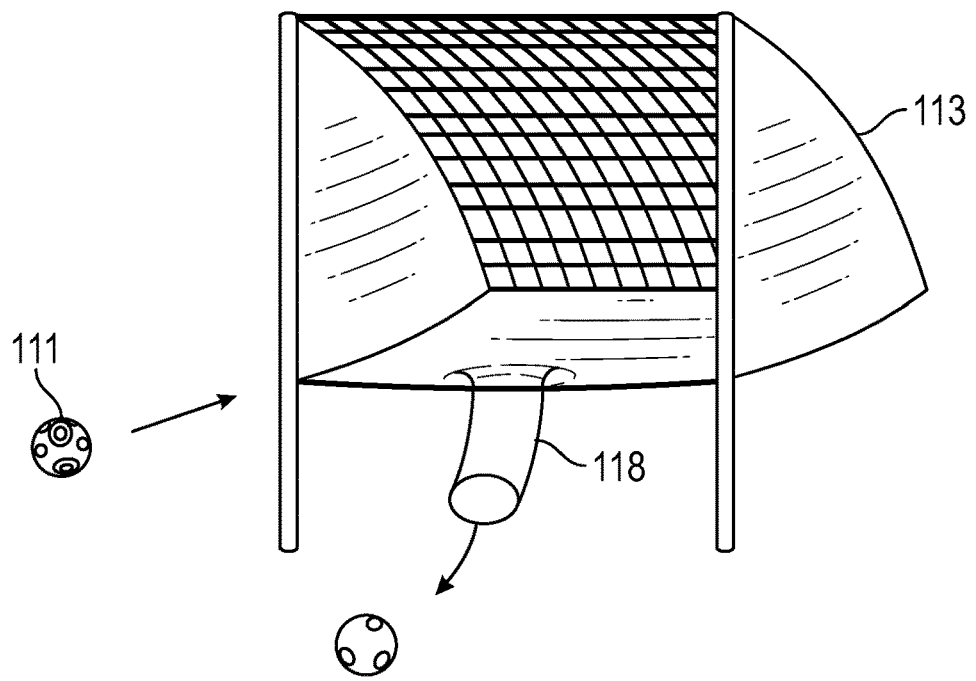
FIG. 8 shows a net used with the practice device of FIG. 1.

FIG. 8 shows a particular embodiment in which the net 113 is a paraboloid having an entrance to the chute 118 at a focus thereof. This causes balls 111 received at the net 113 to be directed more rapidly towards the chute's entrance.

Figure 9:
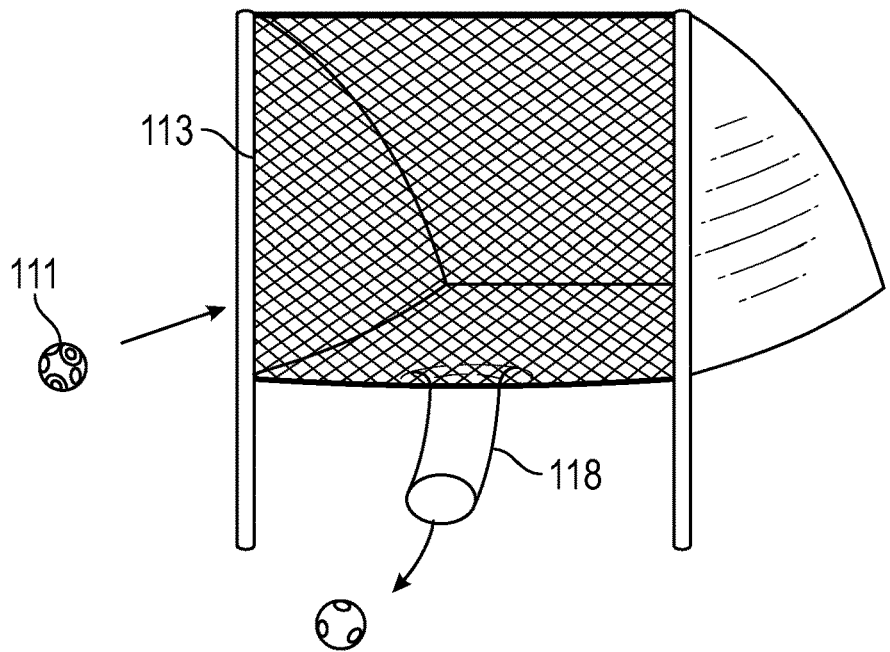
FIG. 9 shows another net used with the practice device of FIG. 1.

FIG. 9 shows another embodiment in which the net 113 takes the form of a hanging curtain. Because the net 113 is not taut, it absorbs kinetic energy of a ball 111 that strikes it. The ball 111, having been robbed of its kinetic energy, falls towards the chute 118. Such a net 113 suppresses the ball's tendency to rebound.

Figure 10:
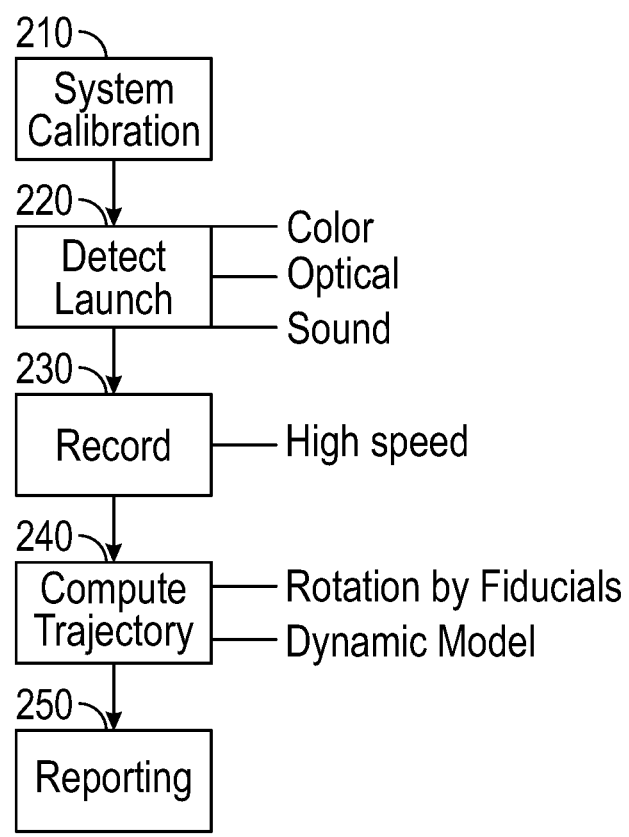
FIG. 10 shows details of a process carried out by the processor of the practice device shown in FIG. 1.

Referring to FIG. 10, operation of the practice device 100 includes a calibrating the processing system 120 to ensure that image data received by the camera 114 is suitable for processing (step 210). The camera 114 should be oriented with its field-of-view facing the player 112 so as to maximize collection of usable information.

In many implementations, the tennis player 112 seeks feedback on individual returns. Thus, the processing system 120 is configured to record and process each return of a launched tennis ball 111.

The processing system 120 segments the training into individual shots. Each shot is recorded and processed, after which the processing system 120 returns to waiting for the next shot. It is therefore useful to signal the processing system 120 that service has occurred and that the next shot should be recorded.

To that end, the camera 114 is configured to detect a launch (step 220) and to record individual frames associated with the ball's return (step 230).

The step of detecting that a ball has been served (step 220) and thus triggering the camera 114 can be accomplished using a variety of techniques.

In some examples, detection of service is achieved by detecting a vibration, for example using the smart phone's built-in accelerometer, or detecting a characteristic launch sound, using the smart phone's built-in microphone. It is also possible to detect a launch (step 220) by observing a ball in the camera's field-of-view.

In some cases, processing power is insufficient to record and process data at a rate that is acceptable to detect service of a ball. This is particularly true for contemporary smart phones, which often lack such processing power. It is therefore useful, when detecting service, to set the camera to low resolution, thus enabling image data to be quickly be processed.

The processing system 120 detects service by comparing frames and looking for color information that would indicate a ball's presence. Due to the camera's proximity to the server, this change will be quite large and therefore easily detected.

To further promote detection, it is useful for the processing system 120 to average each of several vertical segments of the field-of-view. When the color matches the color set for detection in a particular strip, the processing system 120 assumes that it has detected a ball in that strip. When enough lines indicate that a ball is present the processing system 120 signals that a ball has been served. This method eliminates background balls as they are too small to trigger a vertical segment.

Other methods of service detection are useful when the camera 114 is part of a smart phone, as shown in FIG. 2. In such cases, it is possible to rigidly couple the smart phone to the server, thus permitting the vibrations and shocks associated with service to be detected.

In some embodiments, the sound of the ball 111 hitting the racket 115 provides a signal to start recording.

In other embodiments, the timing between recording events is predictable. In such cases, a timer signals the processing system 120 to start and end recording at particular intervals.

Where processing power is adequate, it is useful to have the camera 114 record continuously and to have the processing system 120 continuously analyze the scene to identify triggering events. Examples of triggering events that would trigger image processing include characteristic motion of objects. For example, a player's sudden movement in response to service provides a triggering event.

Figure 11:
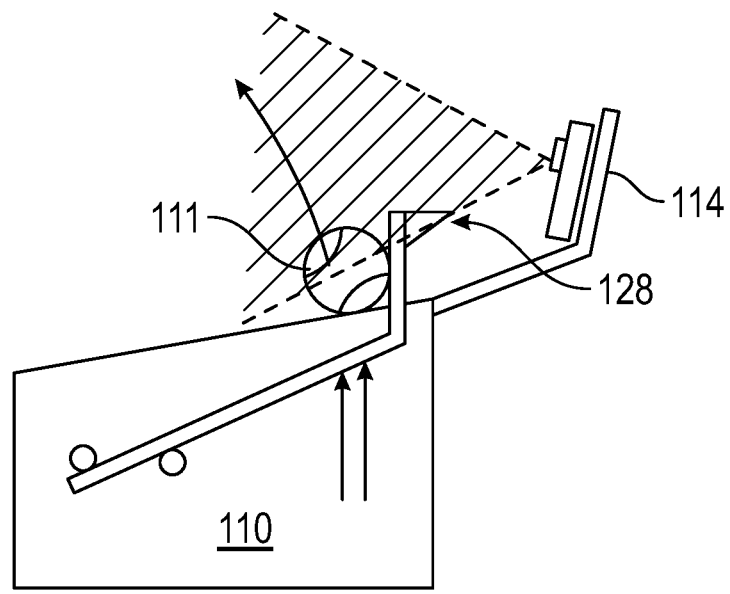
FIG. 11 shows a server raising a flag to signal service.
Figure 12:
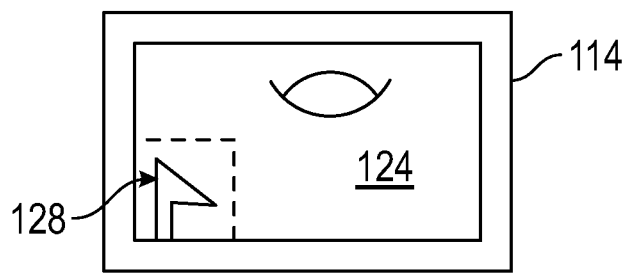
FIG. 12 shows the camera's field of view with a raised flag.

Other methods of detecting service include providing the server 110 with a mechanical flag 128, as shown in FIG. 11. In this embodiment, the server 110 raises the flag 128 into the camera's field-of-view, as shown in FIG. 12. This occurs within a brief interval that includes the time of service. Raising the flag 128 provides an obvious and repeatable cue for the processing system 120. Naturally, after completion of processing, the flag 128 is lowered so that it can be raised again.

Figure 13:
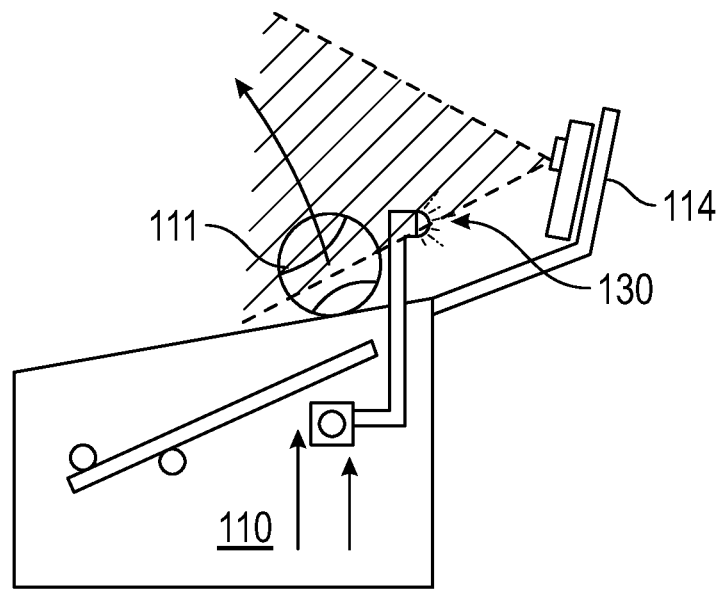
FIG. 13 shows a server flashing a light.
Figure 14:
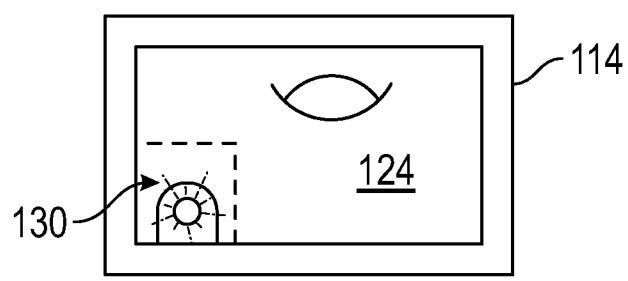
FIG. 14 shows the camera's field of view with a flashing light.

Another embodiment, shown in FIG. 13, features a light source 130 in the camera's field of view, as seen in FIG. 14. In this embodiment, the server 110 flashes the light source 130 within a brief interval that includes the time of service. Flashing the light source 130 provides an obvious and repeatable cue for the processing system 120.

Because it is only the return of the tennis ball 111 that is of interest, it is useful to delay the onset of the camera's image acquisition based on the launch characteristics, such as angle and velocity, until such time as the player 112 is expected to hit the ball 111. In other embodiments, recording begins at the time of launch. In these embodiments, the processing system 120 simply ignores frames that were acquired before the ball 111 has been struck.

The processing system 120 receives the recorded frames and proceeds to compute trajectory characteristics (step 240).

The trajectory characteristics are then provided to the tennis player or to a tennis coach through the user interface 122 on a display 124 (step 250).

In some embodiments, the server 110 includes a catapult and a power source. The power source can be a DC power source, such as a battery, or an AC power. The server's service frequency is adjustable. To simulate the experience of playing tennis, it is useful to have a service frequency of approximately fifteen serves per minute.

In some embodiments, the server 110 serves to a fixed location. However, in other embodiments, the server 110 serves to different locations. In other embodiments, the server 110 serves to a location defined by a random variable having a particular probability distribution. In some cases, the distribution depends on where the server 110 has served previously. In yet other embodiments, the server 110 features a camera that views the player's location and serves to a location that depends at least in part on that location. Since the location depends on an initial velocity vector, servers that serve to different locations are inherently serving with different initial velocity vectors.

Finally, although configuration and operation of the practice device 100 has been described in the context of tennis, and in particular, in terms of determining trajectory characteristics of a returned tennis ball, the practice device 100 is applicable to other fast-moving objects including balls used in other sports.

Having described the invention and a preferred embodiment thereof, what is claimed as new and secured by Letters Patent is:

The invention claimed is:

1. An apparatus comprising a practice device, said practice device comprising a launcher, an image detector, and a processor, wherein said launcher is configured for propelling a projectile away from said practice device, wherein said image detector is configured to and positioned relative to said launcher for observing said projectile as said projectile is returned to said practice device, wherein said processor is configured to calculate and store data concerning motion of said projectile based at least in part on frames received from said image detector, and wherein said launcher is further configured to propel said projectile outside said practice device and wherein said image detector observes said projectile as said projectile returns from outside said practice device to inside said practice device.

2. The apparatus of claim 1, wherein said launcher comprises a catapult.

3. The apparatus of claim 1, wherein said processor is configured to trigger said image detector based on an event that occurs after having launched said projectile.

4. The apparatus of claim 1, wherein said practice device further comprises a display that uses a graphic overlay to show lines to indicate features of a virtual tennis court, said features including lines on said court's surface and a tennis net, thereby enabling said player to align court features and to visualize a virtual trajectory of said projectile as it would appear on an actual tennis court.

5. The apparatus of claim 1, wherein said practice device has a footprint that enables said practice device to fit into a room having a width and a height of eight feet and a length of nine feet.

6. The apparatus of claim 1, wherein said image detector is further configured to avoid acquiring images until said projectile has been struck, at which point said image detector begins image acquisition.

7. The apparatus of claim 1, wherein said image detector comprises a camera having a focal axis and wherein said camera is placed such that an expected direction of a velocity vector of said projectile as said projectile travels towards said practice device is coincident with said camera's focal axis.

8. The apparatus of claim 1, wherein said image detector has a maximum resolution and said processor is configured to receive an image at a resolution lower than said maximum resolution.

9. An apparatus comprising a practice device, said practice device comprising a launcher, an image detector, and a processor, wherein said launcher is configured for propelling a projectile away from said practice device, wherein said image detector is configured to and positioned relative to said launcher for observing said projectile as said projectile is returned to said practice device, wherein said processor is configured to calculate and store data concerning motion of said projectile based at least in part on frames received from said image detector, and wherein said practice device further comprises a chute and a hanging curtain that captures said projectile and absorbs kinetic energy thereof, wherein said projectile, now having a reduced kinetic energy, falls towards said chute.

10. The apparatus of claim 9, wherein said practice device further comprises a single unit, wherein said image detector, said launcher, and said processor are all integrated into said unit.

11. The apparatus of claim 9, wherein said image detector is further configured to avoid acquiring images until said projectile has been struck, at which point said image detector begins image acquisition.

12. The apparatus of claim 9, wherein said image detector comprises a camera having a focal axis and wherein said camera is placed such that an expected direction of a velocity vector of said projectile as said projectile travels towards said practice device is coincident with said camera's focal axis.

13. The apparatus of claim 9, wherein said processor is configured to trigger said image detector based on an event that occurs after having launched said projectile.

14. The apparatus of claim 9, wherein said practice device further comprises a display that uses a graphic overlay to show lines to indicate features of a virtual tennis court, said features including lines on said court's surface and a tennis net, thereby enabling said player to align court features and to visualize a virtual trajectory of said projectile as it would appear on an actual tennis court.

15. The apparatus of claim 9, wherein said image detector has a maximum resolution and said processor is configured to receive an image at a resolution lower than said maximum resolution.

16. An apparatus comprising a practice device, said practice device comprising a launcher, an image detector, and a processor, wherein said launcher is configured for propelling a projectile away from said practice device, wherein said image detector is configured to and positioned relative to said launcher for observing said projectile as said projectile is returned to said practice device, wherein said processor is configured to calculate and store data concerning motion of said projectile based at least in part on frames received from said image detector, and wherein said practice device further comprises a net that intercepts said projectile while said projectile is returning to said practice device, wherein said image detector observes an observed trajectory of said projectile, and wherein said processor is further configured to determine a virtual trajectory of said projectile based at least in part on said observed trajectory, wherein said virtual trajectory is an estimate of where said projectile would have traveled had said projectile not been intercepted in mid-flight by said net, wherein said virtual trajectory includes a virtual landing spot, wherein said virtual landing spot is where said projectile would have landed in an opposing court had said projectile actually traversed said virtual trajectory.

17. The apparatus of claim 16, wherein said processor is configured to accept a selection of a point on a display that corresponds to a required feature, to use said point to determine an angle and position of said image detector, and to use said angle and position thus determined to determine a trajectory of said projectile.

18. The apparatus of claim 16, wherein said image detector is further configured to avoid acquiring images until said projectile has been struck, at which point said image detector begins image acquisition.

19. The apparatus of claim 16, wherein said image detector comprises a camera having a focal axis and wherein said camera is placed such that an expected direction of a velocity vector of said projectile as said projectile travels towards said practice device is coincident with said camera's focal axis.

20. The apparatus of claim 16, wherein said processor is configured to trigger said image detector based on an event that occurs after having launched said projectile.

21. The apparatus of claim 16, wherein said practice device further comprises a display that uses a graphic overlay to show lines to indicate features of a virtual tennis court, said features including lines on said court's surface and a tennis net, thereby enabling said player to align court features and to visualize a virtual trajectory of said projectile as it would appear on an actual tennis court.

22. The apparatus of claim 16, wherein said image detector has a maximum resolution and said processor is configured to receive an image at a resolution lower than said maximum resolution.

* * * * *